(12) United States Patent
Maruyama et al.

(10) Patent No.: US 10,199,064 B2
(45) Date of Patent: Feb. 5, 2019

(54) MAGNETIC RECORDING MEDIUM, AND MAGNETIC RECORDING AND REPRODUCING APPARATUS

(71) Applicant: SHOWA DENKO K.K., Tokyo (JP)

(72) Inventors: Yoshihiko Maruyama, Jurong (SG);
Selvaraj Aanandha, Jurong (SG);
Yuan Ai Khoo, Jurong (SG); Satoru Nakamura, Hsinchu (TW); Hiromitsu Tanuma, Higashine (JP); Eishin Yamakawa, Ichihara (JP)

(73) Assignee: SHOWA DENKO K.K., Tokyo (JP)

( * ) Notice: Subject to any disclaimer, the term of this patent is extended or adjusted under 35 U.S.C. 154(b) by 204 days.

(21) Appl. No.: 15/044,529

(22) Filed: Feb. 16, 2016

(65) Prior Publication Data

US 2016/0240219 A1    Aug. 18, 2016

(30) Foreign Application Priority Data

Feb. 18, 2015  (JP) ................................. 2015-029178
Jul. 3, 2015   (JP) ................................. 2015-134652
Jul. 3, 2015   (JP) ................................. 2015-134658

(51) Int. Cl.
  *G11B 5/72*   (2006.01)
  *G11B 5/725*  (2006.01)
  *G11B 5/82*   (2006.01)

(52) U.S. Cl.
  CPC ................. *G11B 5/725* (2013.01); *G11B 5/72* (2013.01); *G11B 5/82* (2013.01)

(58) Field of Classification Search
  CPC ............ C10M 107/38; C10M 2213/04; C10M 2213/043; C10M 2213/06;
  (Continued)

(56) References Cited

U.S. PATENT DOCUMENTS

| | | | |
|---|---|---|---|
| 6,136,403 A | 10/2000 | Prabhakara et al. | |
| 6,875,492 B1 * | 4/2005 | Pirzada | G11B 5/72 428/216 |

(Continued)

FOREIGN PATENT DOCUMENTS

| | | |
|---|---|---|
| CN | 1989228 A | 6/2007 |
| CN | 101121908 A | 2/2008 |

(Continued)

OTHER PUBLICATIONS

JPO Office Action for Application No. 2015-029178 dated May 12, 2015.

(Continued)

*Primary Examiner* — Holly C Rickman
(74) *Attorney, Agent, or Firm* — Sughrue Mion, PLLC

(57) ABSTRACT

A magnetic recording medium which is capable of effectively preventing a surface thereof from being contaminated, and is capable of preventing a contaminant thereon from adhering (being transferred) to a magnetic head, and a magnetic recording and reproducing apparatus including the magnetic recording medium are provided,
A carbon protective layer of the magnetic recording medium is nitrided, and as a lubricant a compound A expressed by the following General Formula (1) and a compound B expressed by the following General Formula (2) are mixed and used.

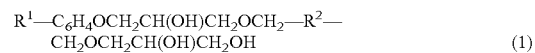

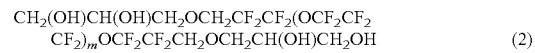

12 Claims, 1 Drawing Sheet

(58) Field of Classification Search
CPC ....... C10M 2213/0606; C10N 2040/18; C10N 2240/204; G11B 5/72; G11B 5/725
See application file for complete search history.

(56) References Cited

U.S. PATENT DOCUMENTS

| | | |
|---|---|---|
| 2011/0064970 A1 | 3/2011 | Chen et al. |
| 2013/0083422 A1* | 4/2013 | Ooeda .................... G11B 5/725 360/75 |
| 2013/0209837 A1* | 8/2013 | Sagata .................... G11B 5/725 428/833 |
| 2014/0139946 A1 | 5/2014 | Ota |
| 2014/0212692 A1* | 7/2014 | Matsumoto .......... C10M 169/04 428/832 |
| 2016/0240219 A1 | 8/2016 | Maruyama et al. |
| 2017/0011765 A1 | 1/2017 | Nakamura et al. |

FOREIGN PATENT DOCUMENTS

| | | |
|---|---|---|
| CN | 102203226 A | 9/2011 |
| CN | 102356431 A | 2/2012 |
| CN | 107004430 A | 8/2017 |
| JP | 62-66417 A | 3/1987 |
| JP | 02010518 A | 1/1990 |
| JP | 6-333231 A | 12/1994 |
| JP | 09171615 A | 6/1997 |
| JP | 9-282642 A | 10/1997 |
| JP | 09288818 A | 11/1997 |
| JP | 10049853 | 2/1998 |
| JP | 2002-275484 A | 9/2002 |
| JP | 2005-122790 A | 5/2005 |
| JP | 2009-211765 A | 9/2009 |
| JP | 2010-108583 A | 5/2010 |
| JP | 2013-157048 A | 8/2013 |
| JP | 2013-163667 A | 8/2013 |
| JP | 2014-116060 A | 6/2014 |

OTHER PUBLICATIONS

Communication dated Jun. 28, 2018 from the State Intellectual Property Office of the P.R.C in counterpart application No. 201610487247.X.
Communication dated Aug. 7, 2018, from the State Intellectual Property Office of People's Republic of China in counterpart Application No. 201610806763.4.
Communication dated Apr. 4, 2018 from the State Intellectual Property Office of the P.R.C. in counterpart Application No. 201610088013.8.
An Office Action dated Feb. 12, 2018, which issued during the prosecution of U.S. Appl. No. 15/202,674.
An Office Action dated Mar. 30, 2018, which issued during the prosecution of U.S. Appl. No. 15/264,988.
Communication dated May 22, 2018, from the Japanese Patent office in counterpart application No. 2015-134652.

* cited by examiner

MAGNETIC RECORDING MEDIUM, AND MAGNETIC RECORDING AND REPRODUCING APPARATUS

The present invention relates to a magnetic recording medium that is suitably used in a magnetic recording and reproducing apparatus such as a hard disk drive, and a magnetic recording and reproducing apparatus including the magnetic recording medium.

Priority is claimed on Japanese Patent Application No. 2015-029178 filed on Feb. 18, 2015, Japanese Patent Application No. 2015-134652 filed on Jul. 3, 2015, and Japanese Patent Application No. 2015-134658 filed on Jul. 3, 2015, the contents of which are incorporated herein by reference.

BACKGROUND OF THE INVENTION

Development of a magnetic recording medium that is suitable for a high recording density has beers in progress so as to improve a recording density of the magnetic recording and reproducing apparatus.

Examples of the magnetic recording medium in the related art include a magnetic recording medium in which a recording layer and the like are stacked on a substrate for a magnetic recording medium, a protective layer such as carbon is formed on the recording layer, and a lubricant layer is formed on the protective layer. The protective layer protects information that is recorded on the recording layer and enhances sliding characteristics of a magnetic head. However, it is difficult to sufficiently obtain durability of the magnetic recording medium by only providing the protective layer on the recording layer.

Therefore, typically, a lubricant is applied onto a surface of the protective layer to form a lubricant layer. When the lubricant layer is provided oil the protective layer, it is possible to prevent the magnetic head of the magnetic recording and reproducing apparatus and the protective layer from coming into direct contact with each other, and it is possible to significantly reduce a friction force of the magnetic head that slides on the magnetic recording medium. As a result, durability is improved.

As the lubricant that is used in the magnetic recording medium, a perfluoropolyether-based lubricant, an aliphatic hydrocarbon-based lubricant, and the like are suggested.

For example, Japanese Unexamined Patent Application, First Publication No. S62-66417 discloses a magnetic recording medium onto which a perfluoroalkyl polyether lubricant having a structure of $HOCH_2$—$CF_2O$—$(C_2F_4O)$p-$(CF_2O)$q-$CH_2OH$ (p and q each represents an integer) is applied.

In addition, Japanese Unexamined Patent Application, First Publication No. H9-282642 discloses a magnetic recording medium onto which a perfluoroalkyl polyether (tetraol) lubricant having a structure of $HOCH_2CH(OH)$—$CH_2OCH_2CF_2O$—$(C_2F_4O)$p-$(CF_2O)$q-$CF_2CH_2OCH_2$—$CH(OH)CH_2OH$ (p and q each represents an integer) is applied.

In addition, Japanese Unexamined Patent Application, First Publication No. 2002-275484 discloses a lubricant for a magnetic recording medium which includes a perfluorooxyalkylene unit selected from —$CF_2O$— and —$CF_2CF_2O$—, and a phosphazene compound.

In addition, Japanese Unexamined Patent Application, First Publication No. 2010-108583 discloses a configuration in which a lubricant layer obtained by mixing a phosphazene compound and a compound including a perfluorooxyalkylene unit in a specific range is used to obtain a lubricant layer having high bonding strength with the protective layer and a high coverage factor even when reducing the layer thickness of the protective layer.

In addition, Japanese Unexamined Patent Application, First Publication No. 2013-163667 discloses a lubricant that contains a compound that is expressed by $R^1C_6H_4O$—$CH_2CH(OH)CH_2OCH_2$—$R^2$—$CH_2$—$O$—$R^3$.

In addition, Japanese Unexamined Patent Application, First Publication No. 2014-116060 discloses that one of ionic contaminants on a magnetic recording medium, which become a cause for occurrence of breakage or contamination in the magnetic head of the magnetic recording and reproducing apparatus, is outgas generated from a siloxane-based organic Si that is used as a rubber seal for hermetic sealing of the magnetic recording and reproducing apparatus.

SUMMARY OF THE INVENTION

The thickness of the lubricant layer is required to be made smaller so as to improve a recording density by decreasing a floating amount of a magnetic head of the magnetic recording and reproducing apparatus.

However, when the thickness of the lubricant layer is made to be smaller, a gap is formed in the lubricant layer. Therefore, there is a concern that a coverage factor on a surface of the magnetic recording medium with the lubricant layer decreases, and a part of a lower layer of the lubricant layer may be exposed. In addition, when the gap is formed in the lubricant layer, an environmental material, which generates a contaminant, intrudes into the lower layer of the lubricant layer from the gap in the lubricant layer, and the magnetic recording medium is contaminated.

The invention has been made in consideration of the above-described circumstances, and an object thereof is to provide a magnetic recording medium which includes a lubricant layer with which a surface of a protective layer can be covered at a high coverage factor even with a small thickness, and in which an ionic component resulting from an environmental material, which intrudes into a lower layer of the lubricant layer, can be prevented from being aggregated, generation of a contaminant that contaminates the magnetic recording medium can be suppressed, a surface thereof can be effectively prevented from being contaminated, and a contaminant thereon can be prevented from adhering (being transferred) to a magnetic head, and a magnetic recording and reproducing apparatus that includes the magnetic recording medium.

The present inventors have intensively studied to obtain a lubricant layer which is not formed in an island shape or a network shape even with a small thickness and with which a surface of a protective layer can be covered at a high coverage factor. As a result, they found that when a protective layer composed of carbon or hydrogenated carbon is modified, and a lubricant layer composed of a specific compound is provided, it is possible to realize a magnetic recording medium of which a surface can be effectively prevented from being contaminated, and a contaminant thereon can be prevented from adhering (being transferred) to the magnetic head, and accomplished the invention.

That is, the invention is as follows.

[1] According to an aspect of the invention, a magnetic recording medium is provided, including at least a magnetic layer, a protective layer, and a lubricant layer in this order on a non-magnetic substrate. The protective layer contains carbon or hydrogenated carbon, the lubricant layer is formed on the protective layer to come into contact therewith, the carbon protective layer in an interface with the lubricant layer contains nitrogen, the amount of nitrogen contained is in a range of 50 atomic % to 90 atomic %, the lubricant layer contains a compound A expressed by the following General Formula (1), and a compound B expressed by the following General Formula (2), a mass ratio (A/(A+B)) of the compound A to the sum of the compound A and the compound B is in a range of 0.05 to 0.9, and an average film thickness of the lubricant layer is in a range of 0.5 nm to 2 nm.

wherein, $R^1$ represents an alkoxy group having 1 to 4 carbon atoms. $R^2$ represents (i) —$CF_2O(CF_2CF_2O)_x(CF_2O)_y$ $CF_2$— (those inside of parentheses x, y are coupled in this order, in reverse order, or in a random manner (x and y each represents real numbers of 0 to 15)), (ii) —$CF_2CF_2O$ $(CF_2CF_2CF_2O)_zCF_2CF_2$— (z represents a real number of 1 to 15), or (iii) —$CF_2CF_2CF_2O(CF_2CF_2CF_2$ $CF_2O)_nCF_2CF_2CF_2$— (n represents a real number of 0 to 4.

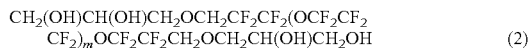

wherein m represents an integer in a range of 4 to 60.

[2] In the magnetic recording medium according to [1], an average molecular weight of the compound A may be in a range of 1000 to 2500.

[3] In the magnetic recording medium according to [1] or [2], an average molecular weight of the compound B may be in a range of 1000 to 8000.

[4] In the magnetic recording medium according to [1] or [3], the protective layer contains carbon or hydrogenated carbon, and only an interface of the protective layer with the lubricant layer is nitrided.

[5] According to another aspect of the invention, a magnetic recording and reproducing apparatus is provided, including the magnetic recording medium according to any one of [1] to [4], a medium drive unit that drives the magnetic recording medium in a recording direction, a magnetic head that performs recording and reproduction of information on and from the magnetic recording medium, a head-moving unit moves the magnetic head relatively to the magnetic recording medium, and a recording and reproducing signal-processing unit that performs processing of a recording and reproducing signal that is transmitted from the magnetic head.

Since the magnetic recording medium of the invention includes the lubricant layer which bonds to the protective layer with strong bonding strength, and is not formed in an island shape or a network shape even with a small thickness, and with which the surface of the protective layer can be covered at a high coverage factor, an environmental material, which generates a contaminant such as an ionic impurity, is prevented from intruding into the lubricant layer from a gap in the lubricant layer. Therefore, it is possible to effectively prevent the magnetic recording medium from being contaminated when the environmental material, which generates a contaminant, intrudes into the lubricant layer from a gap in the lubricant layer, and the environmental material, which intrudes into a lower layer of the lubricant layer, aggregates ionic components present in the lower layer of the lubricant layer, and generates a contaminant that contaminates the magnetic recording medium. Accordingly, in the magnetic recording medium of the invention, the amount of contaminants present on the magnetic recording medium is small.

In addition, since the magnetic recording and reproducing apparatus of the invention includes the magnetic recording medium of the invention in which the amount of contaminants present on the magnetic recording medium is small, deterioration of recording and reproducing characteristics or damage of floating stability, which occurs due to transferring of the contaminants present on the magnetic recording medium to the magnetic head of the magnetic recording and reproducing apparatus, is prevented. As a result, the magnetic recording and reproducing apparatus of the invention has stable magnetic recording and reproducing characteristics.

In addition, since the magnetic recording medium of the invention includes the lubricant layer that is capable of effectively preventing contamination of the surface of the magnetic recording medium even with a small thickness, when the thickness of the lubricant layer is made to be sufficiently small, it is possible to additionally correspond to an improvement in a recording density, and even when being used in a high-temperature state, the magnetic recording medium, is less likely to be contaminated, is excellent in environment resistance, and has stable magnetic recording and reproducing characteristics.

DETAILED DESCRIPTION OF THE INVENTION

Hereinafter, embodiments of the invention will be described in detail.

Figure 1:
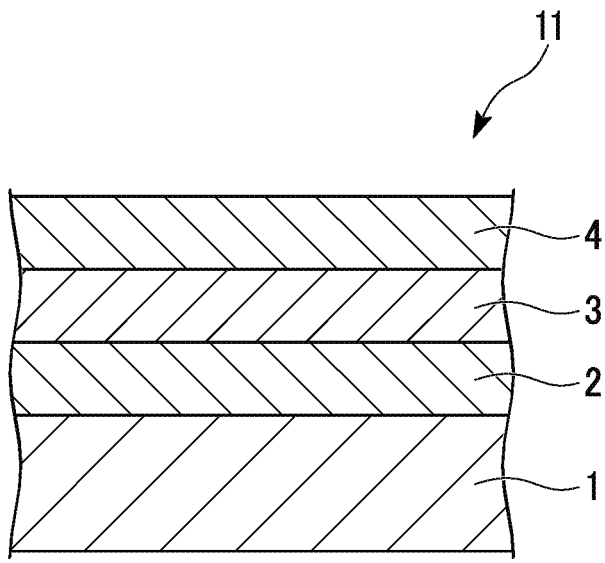
FIG. 1 is a cross-sectional schematic view illustrating an example of a magnetic recording medium of the invention.

FIG. 1 is a cross-sectional schematic view illustrating an example of a magnetic recording medium according to an embodiment of the invention.

As illustrated in FIG. 1, in a magnetic recording medium 11 according to an embodiment of the invention, a magnetic layer 2, a protective layer 3, and a lubricant layer 4 are stacked in this order on a non-magnetic substrate 1.

In addition, in this embodiment, description will be given of a case where an adhesion layer, a soft magnetic base layer, a seed layer, and an orientation control layer are stacked in this order between the non-magnetic substrate 1 and the magnetic layer 2 as an example. The adhesion layer, the soft magnetic base layer, the seed layer, and the orientation control layer are provided as necessary, and a part or the entirety of the layers may not be provided.

Non-Magnetic Substrate

A substrate in which a NiP or NiP alloy film is formed on a base body composed of a metal or an alloy material such as Al or an Al alloy and the like can be used as the non-magnetic substrate 1. In addition, as the non-magnetic substrate 1, a substrate composed of anon-metallic material such as glass, ceramic, silicon, silicon carbide, carbon, and a resin can be used, or a substrate in which NiP or a NiP alloy film is formed on a base body composed of the non-metallic material can be used.

Adhesion Layer

In a case of being disposed to come into contact with the non-magnetic substrate 1 and the soft magnetic base layer that is provided on the adhesion layer, the adhesion layer prevents corrosion of the non-magnetic substrate 1 from progressing. As a material of the adhesion layer, for example, Cr, a Cr alloy, Ti, a Ti alloy, and the like can be appropriately selected. It is preferable that the thickness of the adhesion layer be 2 nm or greater so as to sufficiently obtain an effect in accordance with a configuration in which the adhesion layer is provided.

For example, the adhesion layer can be formed by a sputtering method.

Soft Magnetic Base Layer

It is preferable that the soft magnetic base layer have a structure in which a first soft magnetic film, an intermediate layer constituted by a Ru film, and a second soft magnetic film are stacked in this order. That is, it is preferable that the soft magnetic base layer have a structure in which the intermediate layer constituted by the Ru film is interposed between the two soft magnetic films, and the soft magnetic films on upper and lower sides of the intermediate layer are anti-ferro-coupled (AFC) to each other. When the soft magnetic base layer has the AFC structure, it is possible to enhance resistance against a magnetic field from, an outer side, and resistance against wide area track erasure (WATE) that is a problem specific to vertical magnetic recording.

It is preferable that the film thickness of the soft magnetic base layer be in a range of 15 nm to 80 nm, and more preferably 20 nm to 50 nm. When the film thickness of the soft magnetic base layer is less than 15 nm, there is a concern that a magnetic flux from the magnetic head is not sufficiently absorbed, writing does not become sufficient, and recording and reproducing characteristics may deteriorate. Therefore, this thickness range is not preferable. On the other hand, when the film thickness of the soft magnetic base layer exceeds 80 nm, productivity significantly deteriorates. Therefore, this range is not preferable.

It is preferable that the first and second soft magnetic films be composed of a CoFe alloy. In a case where the first and second soft magnetic films are composed of the CoFe alloy, it is possible to realize a high saturation magnetic flux density Bs (1.4 (T) or greater).

In addition, it is preferable to add any one of Zr, Ta, and Nb to the CoFe alloy that is used for the first and second soft magnetic films. According to this, the first and second soft magnetic films are promoted to be amorphous, it is possible to improve orientation properties of the seed layer, and it is possible to reduce a floating amount of the magnetic head. The soft magnetic base layer can be formed by a sputtering method.

Seed Layer

The seed layer is configured to control the orientation and the crystal size of the orientation control layer and the magnetic layer 2 which are provided on the seed layer, and is provided to enlarge a component of a magnetic flux, which occurs from the magnetic head, in a direction perpendicular to a substrate surface, and to fix a magnetization direction of the magnetic layer 2 in a direction perpendicular to the non-magnetic substrate 1 in a stronger manner.

It is preferable that the seed layer be composed of a NiW alloy. In a case where the seed layer is composed of the NiW alloy, other elements such as B, Mn, Ru, Pt, Mo, and Ta may be added to the NiW alloy as necessary.

It is preferable that the film thickness of the seed layer be in a range of 2 nm to 20 nm. When the film thickness of the seed layer is less than 2 nm, an effect in accordance with a configuration, in which the seed layer is provided, may not be sufficiently obtained. On the other hand, when the film thickness of the seed layer exceeds 20 nm, the size of crystals increases. Therefore, this range is not preferable.

The seed layer can be formed by the sputtering method.

Orientation Control Layer

The orientation control layer is configured to control the orientation of the magnetic layer 2 in a satisfactory manner. It is preferable that the orientation control layer be composed of Ru or a Ru alloy.

It is preferable that the film thickness of the orientation control layer be in a range of 5 nm to 30 nm. When the film thickness of the orientation control layer is set to 30 nm or less, a distance between the magnetic head and the soft magnetic base layer becomes narrow, and it is possible to make the magnetic flux from the magnetic head steep, in addition, when the film thickness of the orientation control layer is set to 5 nm or greater, it is possible to control the orientation of the magnetic layer 2 in a satisfactory manner.

The orientation control layer may be constituted by one layer or a plurality of layers. In a case where the orientation control layer is constituted by a plurality of layers, the entirety of the orientation control layer may be composed of the same material, or at least a part thereof may be composed of a different material.

The orientation control layer can be formed by the sputtering method.

Magnetic Layer

The magnetic layer 2 is constituted by a magnetic film of which an easy-magnetization axis faces a direction that is perpendicular to the substrate surface. The magnetic layer 2 contains Co and Pt, and may further contain an oxide, Cr, B, Cu, Ta, Zr, and the like so as to improve SNR characteristics.

Examples of the oxide that is contained in the magnetic layer 2 include $SiO_2$, $SiO$, $Cr_2O_3$, $CoO$, $Ta_2O_3$, $TiO_2$, and the like.

The magnetic layer 2 may be constituted by one layer or a plurality of layers composed of materials having different compositions.

For example, in a case where the magnetic layer 2 is constituted by three layers including a first magnetic layer, a second magnetic layer, and a third magnetic layer, it, is preferable that the first magnetic layer have a granular structure composed of a material that contains Co, Cr, Pt, and an oxide. As the oxide that is contained in the first magnetic layer, for example, it is preferable to use oxides of Cr, Si, Ta, Al, Ti, Mg, Co, and the like. Among these, particularly, $TiO_2$, $O_2O_3$, $SiO_2$, and the like can be appropriately used. In addition, it is preferable that the first magnetic layer be composed of a composite oxide in which two or more kinds of oxides are added. Among these, particularly, $Cr_2O_3$—$SiO_2$, $Cr_2O_3$—$TiO_2$, $SiO_2$—$TiO_2$, and the like can be appropriately used.

The first magnetic layer may contain one or more kinds of elements selected among B, Ta, Mo, Cu, Nd, W, Nb, Sm, Tb, Ru, and Re in addition to Co, Cr, Pt, and the oxide. When the above-described elements are contained in the first magnetic layer, it is possible to promote miniaturization of magnetic particles, or it is possible to improve crystallinity or orientation properties. As a result, it is possible to obtain recording and reproducing characteristics and thermal fluctuation characteristics which are suitable for writing with a relatively higher density.

The same material as in the first magnetic layer can be used for the second magnetic layer. It is preferable that the second magnetic layer have a granular structure.

In addition, it is preferable that the third magnetic layer have a non-granular structure composed of a material that contains Co, Cr, and Pi, and does not contain an oxide. In addition to Co, Cr, and Pt, the third magnetic layer may contain one or more kinds of elements selected among B, Ta, Mo, Cu, Nd, W, Nb, Sm, Tb, Ru, Re, and Mn. When the third magnetic layer contains the above-described elements in addition to Co, Cr, and Pt, it is possible to promote miniaturization of magnetic particles, or it is possible to improve crystallinity or orientation properties. As a result, it is possible to obtain recording and reproducing characteristics and thermal fluctuation characteristics which are suitable for writing with a relatively higher density.

It is preferable that the thickness of the magnetic layer 2 be set to 5 nm to 25 nm. When the thickness of the magnetic layer 2 is less than the above-described range, a sufficient reproducing output is not obtained, and the thermal fluctuation characteristics also deteriorate. In addition, in a case where the thickness of the magnetic layer 2 exceeds the above-described range, magnetic particles in the magnetic layer 2 are enlarged, and noise increases during recording and reproduction. As a result, recording and reproducing characteristics represented by a signal/noise ratio (S/N ratio) or writing characteristics (OW) deteriorate. Therefore, this range is not preferable.

In addition, in a case where the magnetic layer 2 is constituted by a plurality of layers, it is preferable that a non-magnetic layer be provided between adjacent magnetic layers. In a case where the magnetic layer 2 is constituted by three layers including the first magnetic layer, the second magnetic layer, and the third magnetic layer, it is preferable that the non-magnetic layer be provided between the first magnetic layer and the second magnetic layer, and between the second magnetic layer and the third magnetic layer.

When the non-magnetic layer is provided between the magnetic layers in an appropriate thickness, magnetization inversion of individual films becomes easy, it is possible to decrease dispersion in the magnetization inversion of the entirety of magnetic particles, and it is possible to further improve the S/N ratio.

As the non-magnetic layer that is provided between the magnetic layers, for example, Ru, a Ru alloy, a CoCr alloy, a CoCrX1 alloy (X1 represents at least one or more kinds of elements selected among Pt, Ta, Zr, Re, Ru, Cu, Nb, Ni, Mn, Ge, Si, O, N, W, Mo, Ti, V, Zr, and B), and the like can be appropriately used.

In addition, as the non-magnetic layer that is provided between the magnetic layers, it is preferable to use an alloy material including an oxide, a metal nitride, or metal carbide. Specifically, as the oxide, for example, $SiO_2$, $Al_2O_3$, $Ta_2O_5$, $Cr_2O_3$, MgO, $Y_2O_3$, $TiO_2$, and the like can be used. As the metal nitride, for example, AlN, $Si_3N_4$, TaN, CrN, and the like can be used. As the metal carbide, for example, TaC, BC, SiC, and the like can be used.

It is preferable that the thickness of the non-magnetic layer provided between the magnetic layers be set to 0.1 nm to 1 nm. When the thickness of the non-magnetic layer is set in the above-described range, it is possible to further improve the S/N ratio.

The non-magnetic layer can be formed by the sputtering method.

In addition, it is preferable that the magnetic layer 2 be a magnetic layer of vertical magnetic recording in which an easy-magnetization axis faces a direction perpendicular to the substrate surface so as to realize a relatively higher recording density, but in-plane magnetic recording is also possible.

The magnetic layer 2 may be formed by any known method of the related art such as a deposition method, an ion beam sputtering method, and a magnetron sputtering method, but is typically formed by the sputtering method.

Protective Layer and Lubricant Layer

The protective layer 3 protects the recording layer 2. The protective layer 3 may be constituted by one layer or a plurality of layers. The protective layer 3 of this embodiment is composed of carbon or hydrogenated carbon, and is preferably composed of carbon.

In the invention, the lubricant layer 4 is provided to come into contact with the protective layer 3, and allows nitrogen to be contained in the carbon or hydrogenated carbon of the protective layer 3 at an interface with the lubricant layer 4. In addition, the amount of nitrogen contained in the interface with the lubricant layer 4 is set in a range of 50 atomic % to 90 atomic %. According to this configuration, the protective layer 3 and the lubricant layer 4 are bonded to each other with high bonding strength. As a result, even though the thickness of the lubricant layer 4 is small, in the magnetic recording medium 11, a surface of the protective layer 3 is covered with the lubricant layer 4 at a high coverage factor. Accordingly, it is possible to effectively prevent contamination of the surface of the magnetic recording medium 11.

That is, the lubricant layer of the invention contains a compound A expressed by General Formula (1) and a compound B expressed by General Formula (2) in a state in which a mass ratio (A/(A+B)) of the compound A to the sum of the compound A and the compound B is set in a range of 0.05 to 0.9. According to an examination performed by the present inventors, it has been found that a six-membered ring contained in the compound A strongly bonds to a carbon atom, and a hydroxyl group contained in the compound B strongly bonds to a nitrogen atom. Accordingly, when the amount of nitrogen contained in the protective layer 3, which contains carbon, at the interface with the lubricant layer 4 is set in the above-described specific range, the protective layer 3 and the lubricant layer 4 bond to each other with high bonding strength. Accordingly, even when the thickness of the lubricant layer 4 is made to be small, the surface of the protective layer 3 can be covered with the lubricant layer 4 at a high coverage factor.

It is preferable that the film thickness of the protective layer 3 be set in a range of 1 nm to 10 nm. In a case where the film thickness of the protective layer 3 is in the above-described range, it is possible to sufficiently reduce magnetic spacing in a magnetic recording and reproducing apparatus that includes the magnetic recording medium 11 according to this embodiment. Furthermore, it is possible to correspond to an improvement in a recording density, and it is possible to improve durability. In addition, the magnetic spacing represents a distance between the magnetic head and the magnetic layer 4. As the magnetic spacing is made to be narrower, it is possible to further improve electromagnetic conversion properties of the magnetic recording and reproducing apparatus.

When the film thickness of the protective layer 3 is less than 1 nm, an effect of protecting the recording layer 2 may be insufficient. In addition, when the film thickness of the protective layer 3 exceeds 10 nm, a reduction in the magnetic spacing may be insufficient.

As a method of forming the protective layer 3, a sputtering method that uses a carbon target material, a chemical vapor deposition (CVD) method that uses a hydrocarbon raw material such as ethylene and toluene, an ion beam deposition (IBD) method, and the like can be used.

In the invention, as the method of allowing nitrogen to be contained in the protective layer 3, a known method can be used. However, it is preferable to use a method of allowing nitrogen to be contained in a carbon raw material during film formation, and a method of implanting a nitrogen ion into the protective layer 3. Particularly, as a method of nitriding only an interface of the protective layer 3 with the lubricant layer 4, it is preferable to employ a method in which the protective layer 3 is formed from carbon or hydrogenated carbon, and then a nitrogen ion is implanted into only a surface of the protective layer 3, or a method of exposing the surface of the protective layer 3 to nitrogen plasma to nitride the surface.

In the invention, the amount of nitrogen contained in the interface of the protective layer 3 with the lubricant layer 4 is set in a range of 50 atomic % to 90 atomic %. However, in the above-described method, the amount of the nitrogen contained may be set by controlling a concentration of nitrogen that is allowed to be contained in the carbon raw material, an injection amount of nitrogen ions, exposure time to nitrogen plasma, and a nitrogen plasma density.

As illustrated in FIG. 1, the lubricant layer 4 is formed on the protective layer 3 to come into contact therewith, and contains the compound A expressed by General Formula (1) and the compound B expressed by General Formula (2).

Compound A

It is preferable that an average molecular weight of the compound A expressed by General Formula (1) be in a range of 1000 to 2500.

Examples of the compound A include ART-1 (product name, manufactured by MORESCO Corporation) and DART-1 (product name, manufactured by MORESCO Corporation). ART-1 (product name) is a material in which $R^1$ represents an alkoxy group having 1 carbon atom, and x and y are each in a range of 3 to 7. DART-1 (product name) is a material in which, $R^1$ represents an alkoxy group having 1 carbon atom, $R^2$ represents —$CF_2CF_2O(CF_2CF_2CF_2O)_zCF_2CF_2$— (z is a real number of 1 to 15), and an average molecular weight is in a range of 1000 to 2500.

Compound B

It is preferable that an average molecular weight of the compound B expressed by General Formula (2) be in a range of 1000 to 8000 and more preferable that an average molecular weight of the compound B expressed by General Formula (2) be in a range of 1000 to 2500.

Examples of the compound B include D4OH (product name, manufactured by MORESCO Corporation). In D4OH (product name), m in General Formula (2) is in a range of 4 to 30, and an average molecular weight is in a range of 1000 to 5000.

Mass Ratio (A/(A+B))

In the lubricant layer 4, the mass ratio (A(A+B)) of the compound A to the sum of the compound A and the compound B is in a range of 0.05 to 0.9, and preferably in a range of 0.1 to 0.8. When the mass ratio (A/(A+B)) is set in the range of 0.05 to 0.9, as described above, the bonding between the lubricant layer 4 that is formed by the compound A and the compound B, and a carbon atom and a nitrogen atom which form the protective layer 3 is reinforced. Accordingly, the protective layer 3 and the lubricant layer 4 are bonded to each other with sufficiently high bonding strength. In addition, in a case where the mass ratio (A/(A+B)) is set in the range of 0.1 to 0.8, the bonding strength between the protective layer 3 and the lubricant layer 4 becomes farther higher. Therefore, it is possible to more effectively prevent an environmental material, which generates a contaminant, from intruding into the lubricant layer 4 from the gap in the lubricant layer 4.

In a case where the mass ratio (A/A+B)) is less than 0.05, the compound A becomes deficient. Therefore, the lubricant layer 4 is likely to be formed in an island shape, and a coverage factor of the protective layer 3 becomes insufficient. In addition, when the mass ratio (A/A+B)) exceeds 0.9, the compound B becomes deficient. Therefore, the lubricant layer 4 is likely to be formed in a network shape, and the coverage factor of the protective layer 3 becomes insufficient.

Film Thickness of Lubricant Layer

The average film thickness of the lubricant layer 4 is set in a range of 0.5 nm (5 Å) to 2 nm (20 Å), and preferably in a range of 1 nm to 1.9 nm.

When the average film thickness of the lubricant layer 4 is set to 0.5 nm or greater, the characteristics of the lubricant layer 4 that is formed by the compound A and the compound B are utilized. Accordingly, the lubricant layer 4 is not formed in the island shape or the network shape, and it is possible to cover the surface of the protective layer 3 in a uniform film thickness at a high coverage factor.

In addition, when the average film thickness of the lubricant layer 4 is set to 2 nm or less, the floating amount of the magnetic head sufficiently decreases, and it is possible to increase a recording density of the magnetic recording medium 11.

In addition, in a film that, is formed by using only the compound A and has an average film thickness of 2 nm or less, the compound A has a molecular structure having a large cyclic skeleton. Therefore, the film has a network shape, and it is difficult to cover the surface of the protective layer 3 at a sufficiently high coverage factor.

In addition, in a film that is formed by using only the compound B and has an average film thickness of 2 nm or less, the bonding strength (wettability) with the protective layer 3 becomes also insufficient. Therefore, the film has an island shape, and it is difficult to cover the surface of the protective layer 3 at a sufficiently high coverage factor.

In a case where the surface of the protective layer 3 is not covered with the lubricant layer 4 at a sufficiently high coverage factor, water, which includes an environmental material that generates a contaminant such as an ionic impurity adsorbed to the surface of the magnetic recording medium 11, escapes from the gap in the lubricant layer 4, and intrudes into a lower side of the lubricant layer 4. The environmental material, which intrudes into a lower layer of the lubricant layer, aggregates minute ionic components which are hidden under the lubricant layer 4 to generate the ionic contaminant. In addition, the contaminant (aggregated component) adheres (is transferred) to the magnetic head during magnetic recording and reproduction. Therefore, the magnetic head may be broken, or the magnetic recording and reproducing characteristics of the magnetic recording and reproducing apparatus may deteriorate.

The problem, which is caused by the intrusion of the environmental material from the gap in the lubricant layer 4, becomes more significant when the magnetic recording medium 11 is maintained under a high-temperature condition.

Method of Forming Lubricant Layer

For example, a magnetic recording medium in the middle of manufacturing, in which the respective layers up to the protective layer 3 are formed on the non-magnetic substrate 1, is prepared, and then a lubricant layer-forming solution is applied onto the protective layer 3 of the magnetic recording medium in the middle of the manufacturing to form the lubricant layer 4.

The lubricant layer-forming solution is obtained as follows. The compound A and the compound B are mixed so that the mass ratio (A/(A+B)) of the compound A to the sum of the compound A and the compound B becomes a range of 0.05 to 0.9, and the resultant mixture is diluted with a solvent to be a viscosity and a concentration which are suitable for an application method.

Examples of the solvent that is used, in the lubricant layer-forming solution include a fluorine-based solvent such as Vertrel-XF (manufactured by Du Pont-Mitsui Fluorochemicals Co., Ltd.).

Although not particularly limited, examples of a method of applying the lubricant layer-forming solution include a spin coat method, a dipping method, and the like.

In a case of using the dipping method, for example, the flowing method of applying the lubricant layer-forming solution onto the surface of the protective layer 3 of the non-magnetic substrate 1 can be used. In the method, the non-magnetic substrate 1, on which the respective layers up to the protective layer 3 are formed, is immersed in the lubricant layer-forming solution that is put into an immersion bath of a dip coating apparatus, and then the non-magnetic substrate 1 is pulled up from the immersion bath at a predetermined speed. When using the dipping method, it is possible to uniformly apply the lubricant layer-forming solution onto the surface of the protective layer 3 of the non-magnetic substrate 1. Accordingly, it is possible to form the lubricant layer 4 having a uniform film thickness on the protective layer 3.

Magnetic Recording and Reproducing Apparatus

Figure 2:
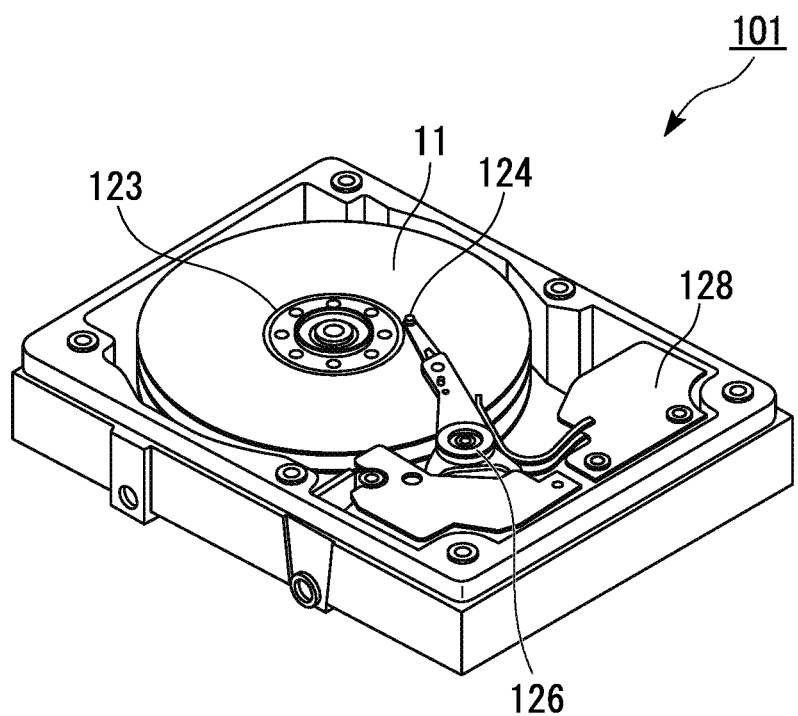
FIG. 2 is a perspective view illustrating an example of a magnetic recording and reproducing apparatus of the invention.

Next, description will be given of an example of the magnetic recording and reproducing apparatus according to the embodiment of the invention. FIG. 2 is a perspective view illustrating an example of the magnetic recording and reproducing apparatus according to the embodiment of the invention.

A magnetic recording and reproducing apparatus 101 according to the embodiment of the invention includes the magnetic recording medium 11, which is illustrated in FIG. 1, according to the embodiment of the invention, a medium drive unit 123 that drives the magnetic recording medium 11 in a recording direction, a magnetic head 124 including a recording unit and a reproducing unit, a head-moving unit 126 that moves the magnetic head 124 relatively to the magnetic recording medium 11, and a recording and reproducing signal-processing unit 128 that performs processing of a recording and reproducing signal that is transmitted from the magnetic head 124.

When an element unit (reproducing unit) of the magnetic head 124 is constituted by a GMR head or a TMR head, it is possible to obtain signal strength that is sufficient for high recording density, and it is possible to realize a magnetic recording and reproducing apparatus having a high recording density.

The magnetic recording and reproducing apparatus 101 according to this embodiment includes the magnetic recording medium 11 in which the amount of contaminants present on the magnetic recording medium is small. Accordingly, deterioration of recording and reproducing characteristics or damage of floating stability, which occurs due to transferring of the contaminants present on the magnetic recording medium 11 to the magnetic head 124 of the magnetic recording and reproducing apparatus 101, is prevented. As a result, the magnetic recording and reproducing apparatus 101 of the invention has stable magnetic recording and reproducing characteristics.

EXAMPLES

Hereinafter, the invention will be described in detail on the basis of examples. In addition, the invention is not limited to the examples.

Examples 1 to 22, and Comparative Examples 1 to 10

A glass substrate (an external shape: 2.5 inches, manufactured by HOYA GROUP), which was washed, was placed in a film-forming chamber of a DC magnetron sputtering apparatus (C-3040, manufactured by CANON ANELVA CORPORATION), and the inside of the film-forming chamber was evacuated until ultimate vacuum became $1 \times 10^{-5}$ Pa.

Then, an adhesion layer having a layer thickness of 10 nm was formed on the glass substrate by using a Cr target in accordance with the sputtering method.

Subsequently, as a soft magnetic base layer, a first soft magnetic layer, an intermediate layer, and a second soft magnetic layer were formed. The first soft magnetic layer having a layer thickness of 25 nm was formed on the adhesion layer by using a target of a Co—20Fe—5Zr—5Ta (the amount of Fe contained was 20 atomic %, the amount of Zr contained was 5 atomic %, the amount of Ta contained was 5 atomic %, and the remainder was Co) at a substrate temperature of 100° C. or lower in accordance with the sputtering method. The intermediate layer that had a layer thickness of 0.7 nm and was composed of Ru, and the second soft magnetic layer that had a layer thickness of 25 nm and was composed of Co—20Fe—5Zr—5Ta were formed on the first soft magnetic layer.

Next, a seed layer having a layer thickness of 5 nm was formed on the soft magnetic base layer by using a target of Ni—6W (the amount of W contained was 6 atomic %, and the remainder was Ni) in accordance with the sputtering method.

Then, as a first orientation control layer, a Ru layer having a layer thickness of 10 nm was formed on the seed layer in accordance with the sputtering method in which a sputtering pressure was set to 0.8 Pa. Next, as a second orientation control layer, a Ru layer having a layer thickness of 10 nm was formed on the first orientation control layer in accordance with the sputtering method in which the sputtering pressure was set to 1.5 Pa.

Subsequently, a first magnetic layer composed of 91(Co—15Cr—16Pt)—6($SiO_2$)—3($TiO_2$) (an alloy, in which the amount of Cr contained was 15 atomic %, the amount of Pt contained was 16 atomic %, and the remainder was Co, was set to 91 mol %, an oxide composed of $SiO_2$ was set to 6 mol %, and an oxide composed of $TiO_2$ was set to 3 mol %) was formed on the second orientation control layer in a layer thickness of 9 nm in accordance with the sputtering method in which the sputtering pressure was set to 2 Pa.

Next, anon-magnetic layer composed of 88(Co—30Cr)—12($TiO_2$) (an alloy, in which the amount of Cr contained was 30 atomic % and the remainder was Co, was set to 88 mol %, and an oxide composed of $TiO_2$ was set to 12 mol %) was formed on the first magnetic layer in a layer thickness of 0.3 nm in accordance with the sputtering method.

Then, a second magnetic layer composed of 92(Co—11Cr—18Pt)—5($SiO_2$)—3($TiO_2$) (an alloy, in which the amount of Cr contained was 11 atomic %, the amount of Pt contained was 18 atomic %, and the remainder was Co, was set to 92 mol %, an oxide composed of $SiO_2$ was set to 5 mol %, and an oxide composed of $TiO_2$ was set to 3 mol %) was formed on the non-magnetic layer in a layer thickness of 6 nm in accordance with the sputtering method in which the sputtering pressure was set to 2 Pa.

Then, a non-magnetic layer composed of Ru was formed on the second magnetic layer in a layer thickness of 0.3 nm in accordance with the sputtering method.

Subsequently, a third magnetic layer was formed on the non-magnetic layer in a layer thickness of 7 nm by using a target composed of Co—20Cr—14Pt—3B (the amount of Cr contained was 20 atomic %, the amount of Pt contained was 14 atomic %, the amount of B contained was 3 atomic %, and the remainder was Co) in accordance with the sputtering method in which the sputtering pressure was set to 0.6 Pa.

Subsequently, a hydrogenated carbon film was formed on a surface of the magnetic layer by using an ion beam deposition method. As a raw material gas during formation of the hydrogenated carbon film, gasified toluene was used. As film formation conditions, first, a gas flow rate of a raw material gas, which was supplied to a film-forming chamber, was set to 2.9 SCCM, and a reaction pressure was set to 0.2 Pa. In addition, cathode power, which was an excitation source of the raw material gas, was set to 225 W (AC 22.5 V, 10 A). In addition, a voltage between a cathode electrode and an anode electrode covering the cathode electrode was set to 75 V, a current was set to 1650 mA, an ion acceleration voltage was set to 200 V and 180 mA, film formation time was set to 1.5 seconds to form the hydrogenated carbon film having a thickness of 3.5 nm.

After the process of forming the hydrogenated carbon film, supply of the raw material gas was stopped, and the inside of the film-forming chamber was evacuated for 2 seconds. Subsequently, nitrogen was supplied into the film-forming chamber at a gas flow rate of 2 SCCM and a reaction pressure of 5 Pa. In addition, the cathode power was set to 128 W (AC 16 V, 8 A). In addition, the surface of the hydrogenated carbon film was irradiated with nitrogen ions which were formed from a nitrogen gas in which state in which a voltage between the cathode electrode and the anode electrode was set to 75 V, a current was set to 1000 mA, an ion acceleration voltage was set to 200 V and 90 mA, and processing time was set to 1 second. According to this, dehydrogenation and nitrification of the surface of the hydrogenated carbon film were performed.

After processing the surface of the hydrogenated carbon film, a composition of an outermost surface of the hydrogenated carbon film was measured by secondary ion mass spectrometry (SIMS), According to the measurement, nitrogen was 80 atomic % and carbon was 20 atomic % (Example 1). In addition, in Examples 2 to 22, and Comparative Examples 1 to 10, dehydrogenation and nitrification processing time of the surface of the hydrogenated carbon film was adjusted to change the composition of the outermost surface (an interface portion of the protective layer with the lubricant layer) of the hydrogenated carbon film as illustrated in Tables 1 and 2.

Next, a lubricant layer was formed on the protective layer by using the dipping method as described below.

As the compound A and the compound B for formation of the lubricant layer, ART-1 (product name) or DART-1 (product name) and D4OH (product name) were used, respectively. In addition, in other cases, as illustrated in Tables 1 and 2, A2OH-2000 (product name, manufactured by MORESCO Corporation) (abbreviated as "A2OH" in Tables 1 and 2) or ADOH-2000 (product name, manufactured by MORESCO Corporation) (abbreviated as "ADOH" in Tables 1 and 2) was used. A2OH and ADOH are not equivalent to the compound A and the compound B of the invention, but are described as the compound A in Tables 1 and 2 for convenience.

With regard to A2OH-2000 (product name), in the following General Formula (3), x was 5, $R_1$ was $CF_3$, $R_2$ was —$OCH_2CF_2O(CF_2CF_2O)_t(CF_2O)_uCF_2CH_2OH$ (t was 10.5, and u was 10.1).

In addition, with regard to ADOH-2000 (product name), in the following General Formula (3), x was 5, $R_1$ was $CF_3$, $R^2$ was —$OCH_2CF_2O(CF_2CF_2O)_p(CF_2O)_qCF_2CH_2OCH_2CH(OH)CH_2OH$ (p was 10.7, and q was 10.4).

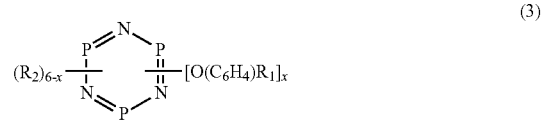

(3)

wherein, x represents an integer of 1 to 5, $R_1$ represents any one of a hydrogen atom, an alkyl group having 1 to 4 carbon atoms, and a halogenated alkyl group having 1 to 4 carbon atoms, $R_2$ represents a substituent group of which an end group is —$CH_2OH$ or —$CH(OH)CH_2OH$.

In addition, the mass ratio (A/(A+B)) of the above-described compounds was adjusted as illustrated in Tables 1 and 2 to obtain the lubricant layer-forming solution. In addition, as a solvent that dissolves the lubricant layer-forming solutions in all of Examples 1 to 22 and Comparative Examples 1 to 10, Vertrel-XF (product name, manufactured by Du Pont-Mitsui Fluorochemicals Co., Ltd.) was used. In addition, a concentration of the lubricant in the lubricant layer-forming solution in all of Examples 1 to 22 and Comparative Examples 1 to 10 was set to 0.3% by mass.

Next, the lubricant layer-forming solution of each of Examples 1 to 22 and Comparative Examples 1 to 10 was applied onto the protective layer of the non-magnetic substrate by using the dipping method in accordance with the following method.

That is, the non-magnetic substrate, on which the respective layers up to the protective layer were formed, was immersed in the lubricant layer-forming solution that was put into the immersion bath of a dip coating apparatus, and then the non-magnetic substrate was pulled up from, the immersion bath at a predetermined speed to apply the lubricant layer-forming solution onto a surface of the protective layer of the non-magnetic substrate. The layer thickness of was set to 1.3 nm in each case.

Then, the surface onto which the lubricant layer-forming solution was applied was dried to form the lubricant layer, thereby obtaining magnetic recording media of Examples 1 to 22 and Comparative Examples 1 to 10.

The mass ratio (A/(A+B)) of the compound A to the sum of the compound A and the compound B of the magnetic recording media, which were obtained as described above, is illustrated in Tables 1 and 2.

Evaluation of Environment Resistance of Magnetic Recording Medium

Environment resistance of the magnetic recording media of Examples 1 to 22 and Comparative Examples 1 to 10 was evaluated in accordance with the following method. The following evaluation of the environment resistance is one of evaluation methods of investigating contamination of a magnetic recording medium due to an environmental material that generates a contaminant under a high-temperature environment. In the following evaluation of the environment resistance, Si ions were used as an environmental material that generates a contaminant under the high-temperature environment, and an adsorption amount of Si was measured as the amount of contaminants which are generated due to the environmental material and contaminate the magnetic recording medium.

Specifically, first, the magnetic recording medium, which was a target to be evaluated, was retained under the high-temperature environment in which a temperature was set to 85° C., and humidity was set to 0% in the presence of a siloxane-based Si rubber for 240 hours.

Next, the adsorption amount of Si present on the surface of the magnetic recording medium was analyzed and measured by using SIMS, and the degree of contamination due to an Si ion, which is an environmental material under the high-temperature environment, was evaluated as the adsorption amount of Si.

In addition, evaluation of the adsorption amount of Si was performed by using a numerical value when a result of Comparative Example 1 was set to 1.00. Results are illustrated in Tables 1 and 2.

From Tables 1 and 2, it was clear that in the magnetic recording media of Examples 1 to 22, the adsorption amount of Si was very small and contamination due to the environmental material under the high-temperature environment was less likely to occur in comparison to the magnetic recording media of Comparative Examples 1 to 10.

TABLE 1

|  | Compound A | Compound B | Mass ratio (A/(A + B)) | Interface composition (C/H/N (atomic %)) | Si adsorption amount (relative value) |
|---|---|---|---|---|---|
| Example 1 | ART-1 | D4OH | 0.1 | 20/0/80 | 0.34 |
| Example 2 | ART-1 | D4OH | 0.2 | 20/0/80 | 0.31 |
| Example 3 | ART-1 | D4OH | 0.4 | 20/0/80 | 0.25 |
| Example 4 | ART-1 | D4OH | 0.6 | 20/0/80 | 0.34 |
| Example 5 | ART-1 | D4OH | 0.8 | 20/0/80 | 0.35 |
| Example 6 | ART-1 | D4OH | 0.9 | 20/0/80 | 0.37 |
| Example 7 | ART-1 | D4OH | 0.05 | 20/0/80 | 0.42 |
| Comparative Example 1 | A2OH | — | 1.0 | 20/0/80 | 1.00 |
| Comparative Example 2 | ADOH | — | 1.0 | 20/0/80 | 1.10 |
| Comparative Example 3 | ART-1 | — | 1.0 | 20/0/80 | 0.91 |
| Comparative Example 4 | — | D4OH | 0 | 20/0/80 | 0.89 |
| Comparative Example 5 | A2OH | D4OH | 0.4 | 20/0/80 | 0.51 |
| Comparative Example 6 | ADOH | D4OH | 0.4 | 20/0/80 | 0.44 |
| Example 8 | ART-1 | D4OH | 0.4 | 10/0/90 | 0.38 |
| Example 9 | ART-1 | D4OH | 0.4 | 30/0/70 | 0.29 |
| Example 10 | ART-1 | D4OH | 0.4 | 40/0/60 | 0.37 |
| Example 11 | ART-1 | D4OH | 0.4 | 50/0/50 | 0.42 |
| Comparative Example 7 | ART-1 | D4OH | 0.4 | 60/0/40 | 0.47 |
| Comparative Example 8 | ART-1 | D4OH | 0.4 | 5/0/95 | 0.45 |
| Comparative Example 9 | ART-1 | D4OH | 0.4 | 80/0/20 | 0.55 |
| Comparative Example 10 | ART-1 | D4OH | 0.4 | 80/20/0 | 0.68 |

TABLE 2

|  | Compound A | Compound B | Mass ratio (A/(A + B)) | Interface composition (C/H/N (atomic %)) | Si adsorption amount (relative value) |
|---|---|---|---|---|---|
| Example 12 | DART-1 | D4OH | 0.1 | 20/0/80 | 0.37 |
| Example 13 | DART-1 | D4OH | 0.2 | 20/0/80 | 0.31 |
| Example 14 | DART-1 | D4OH | 0.35 | 20/0/80 | 0.27 |
| Example 15 | DART-1 | D4OH | 0.6 | 20/0/80 | 0.34 |
| Example 16 | DART-1 | D4OH | 0.8 | 20/0/80 | 0.36 |
| Example 17 | DART-1 | D4OH | 0.9 | 20/0/80 | 0.39 |
| Example 18 | DART-1 | D4OH | 0.05 | 20/0/80 | 0.44 |
| Comparative Example 1 | A2OH | — | 1.0 | 20/0/80 | 1.00 |
| Comparative Example 2 | ADOH | — | 1.0 | 20/0/80 | 1.10 |
| Comparative Example 3 | DART-1 | — | 1.0 | 20/0/80 | 0.93 |
| Comparative Example 4 | — | D4OH | 0 | 20/0/80 | 0.89 |
| Comparative Example 5 | A2OH | D4OH | 0.35 | 20/0/80 | 0.51 |
| Comparative Example 6 | ADOH | D4OH | 0.35 | 20/0/80 | 0.46 |
| Example 19 | DART-1 | D4OH | 0.35 | 10/0/90 | 0.40 |
| Example 20 | DART-1 | D4OH | 0.35 | 30/0/70 | 0.32 |
| Example 21 | DART-1 | D4OH | 0.35 | 40/0/60 | 0.37 |
| Example 22 | DART-1 | D4OH | 0.35 | 50/0/50 | 0.44 |
| Comparative Example 7 | DART-1 | D4OH | 0.35 | 60/0/40 | 0.47 |
| Comparative Example 8 | DART-1 | D4OH | 0.35 | 5/0/95 | 0.45 |

TABLE 2-continued

|  | Compound A | Compound B | Mass ratio (A/(A + B)) | Interface composition (C/H/N (atomic %)) | Si adsorption amount (relative value) |
|---|---|---|---|---|---|
| Comparative Example 9 | DART-1 | D4OH | 0.35 | 80/0/20 | 0.59 |
| Comparative Example 10 | DART-1 | D4OH | 0.35 | 80/20/0 | 0.68 |

The magnetic recording medium and the magnetic recording and reproducing apparatus according to the invention have industrial applicability in industries which use and manufacture a high recording density magnetic recording medium and a magnetic recording and reproducing apparatus.

While preferred embodiments of the invention have been described and illustrated above, it should be understood that these are exemplary of the invention and are not to be considered as limiting. Additions, omissions, substitutions, and other modifications can be made without departing from the spirit or scope of the present invention. Accordingly, the invention is not to be considered as being limited by the foregoing description, and is only limited by the scope of the appended claims.

EXPLANATION OF REFERENCES

1: Non-magnetic substrate
2: Magnetic layer
3: Protective layer
4: Lubricant layer
11: Magnetic recording medium
101: Magnetic recording and reproducing apparatus
123: Medium drive unit
124: Magnetic head
126: Head-moving unit
128: Recording and reproducing signal-processing unit

What is claimed is:

1. A magnetic recording medium comprising:
a magnetic layer, a protective layer, and a lubricant layer in this order on a non-magnetic substrate,
wherein the protective layer comprises carbon or hydrogenated carbon,
the lubricant layer is formed on the protective layer to come into contact therewith,
the carbon protective layer in an interface with the lubricant layer comprises nitrogen,
an amount of the nitrogen contained in the interface is in a range of 50 atomic % to 90 atomic %,
the lubricant layer comprises
a compound A expressed by the following General Formula (1):

$$R^1-C_6H_4OCH_2CH(OH)CH_2OCH_2-R^2- CH_2OCH_2CH(OH)CH_2OH \quad (1)$$

wherein $R^1$ represents an alkoxy group having 1 to 4 carbon atoms, and
$R^2$ represents (i) $-CF_2O(CF_2CF_2O)_x(CF_2O)_yCF_2-$, wherein those inside of parentheses of x, y are coupled in this order, in reverse order, or in a random manner, and x and y each represents real numbers of 0 to 15; (ii) $-CF_2CF_2O(CF_2CF_2CF_2O)_zCF_2CF_2-$, wherein z represents a real number of 1 to 15; or (iii) $-CF_2CF_2CF_2O(CF_2CF_2CF_2CF_2O)_nCF_2CF_2-$, wherein n represents a real number of 0 to 4, and a compound B expressed by the following General Formula (2):

$$CH_2(OH)CH(OH)CH_2OCH_2CF_2CF_2(OCF_2CF_2 CF_2)_mOCF_2CF_2CH_2OCH_2CH(OH)CH_2OH \quad (2)$$

wherein m represents an integer in a range of 4 to 60,
a mass ratio (A/(A+B)) of the compound A to the sum of the compound A and the compound B is in a range of 0.05 to 0.9, and
an average film thickness of the lubricant layer is in a range of 0.5 nm to 2 nm.

2. The magnetic recording medium according to claim 1, wherein an average molecular weight of the compound A is in a range of 1000 to 2500.

3. The magnetic recording medium according to claim 1, wherein an average molecular weight of the compound B is in a range of 1000 to 8000.

4. The magnetic recording medium according to claim 1, wherein the protective layer comprises carbon or hydrogenated carbon, and only an interface of the protective layer with the lubricant layer is nitrided.

5. A magnetic recording and reproducing apparatus comprising:
the magnetic recording medium according to claim 1;
a medium drive unit that drives the magnetic recording medium in a recording direction;
a magnetic head that performs recording and reproduction of information on and from the magnetic recording medium;
a head-moving unit that moves the magnetic head relatively to the magnetic recording medium; and
a recording and reproducing signal-processing unit that perform processing of a recording and reproducing signal that is transmitted from the magnetic head.

6. The magnetic recording medium according to claim 1, wherein the amount of the nitrogen contained in the interface is obtained by measuring a composition of the surface of the protective layer by secondary ion mass spectrometry (SIMS), after the protective layer is formed from carbon or hydrogenated carbon.

7. The magnetic recording medium according to claim 1, wherein the interface with the lubricant layer is obtained by implanting a nitrogen ion into a surface of the protective layer or by exposing a surface of the protective layer to nitrogen plasma, after the protective layer is formed from carbon or hydrogenated carbon.

8. The magnetic recording medium according to claim 6, into a surface of the protective layer or by exposing a surface of the protective layer to nitrogen plasma, after the protective layer is formed from carbon or hydrogenated carbon.

9. The magnetic recording medium according to claim 2, wherein an average molecular weight of the compound B is in a range of 1000 to 8000.

10. The magnetic recording medium according to claim 2, wherein the protective layer comprises carbon or hydrogenated carbon, and only an interface of the protective layer with the lubricant layer is nitrided.

11. The magnetic recording medium according to claim 3, wherein the protective layer comprises carbon or hydrogenated carbon, and only an interface of the protective layer with the lubricant layer is nitrided.

12. The magnetic recording medium according to claim 9, wherein the protective layer comprises carbon or hydrogenated carbon, and only an interface of the protective layer with the lubricant layer is nitrided.

* * * * *